June 17, 1958 G. G. GRIGSBY 2,838,949
SCREW JACK
Filed Dec. 13, 1954

INVENTOR.
GAIL G. GRIGSBY
BY
John H. Cassidy
ATTORNEY

United States Patent Office 2,838,949
Patented June 17, 1958

2,838,949

SCREW JACK

Gail G. Grigsby, Desloge, Mo.

Application December 13, 1954, Serial No. 474,929

2 Claims. (Cl. 74—424.8)

This invention pertains to an actuating screw mechanism or jack which may be arranged for applying a force in substantially any manner in which an ordinary screw may be used. More particularly, it applies to a ball bearing screw having improved means for guiding the travel of the balls.

An object of this invention is to provide a simple structure for actuating a screw of the ball bearing type which can be compact and self-contained.

Generally stated, the structure includes an intermediate sleeve member arranged between inner and outer screw members. A matching thread formed between the intermediate and the outer member, and a similar matching thread formed between the inner and the intermediate member are formed to provide ball races, a suitable assembly of steel balls being arranged to roll in said races. Thus the intermediate member has thread-shaped ball races formed in both its inside and its outside surfaces. These ball races terminate adjacent to each other at both ends of each. And at these points, passageways through the sleeve from the inner to the outer race are provided. The balls rolling in the two pairs of ball races may then pass from the inner to the outer race through the sleeve or vice versa, so that each one of said races may provide a return path for the balls that reach the terminus of the other.

A preferred embodiment of this invention is illustrated in the accompanying drawings, in which—

Figure 1:
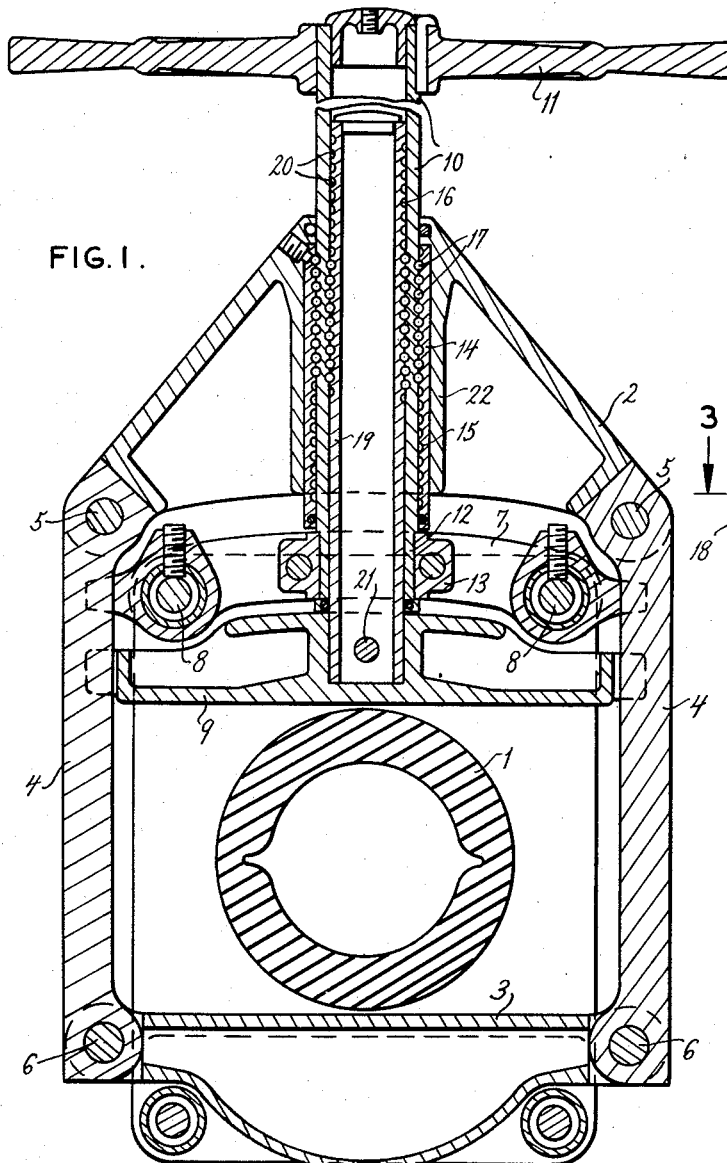
Fig. 1 is an end view partly in section of a pinch valve structure to which a screw jack embodying this invention is applied.
Figure 2:
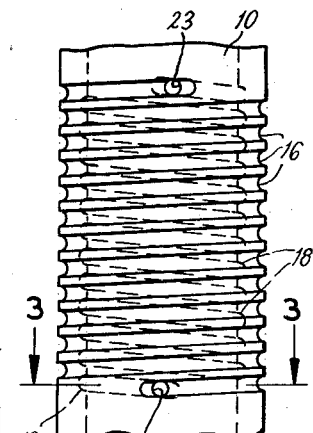
Fig. 2 is a side view, enlarged, of a portion of the intermediate member.
Figure 3:
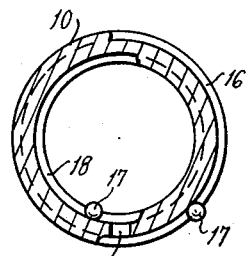
Fig. 3 is a transverse section of the intermediate sleeve, on line 3—3 of Fig. 2 showing one of the passages therethrough.

Referring to the drawing, the device of Fig. 1 is a valve structure designed to collapse or pinch a hose section 1, forming part of a conduit, not shown. The hose section 1 passes through a frame comprising an upper bracket 2, a lower bracket 3, and a pair of links 4 pivoted at 5 to the upper bracket 2, and at 6 to the lower bracket 3. The device is supported on a supporting bracket 7 adjustably secured to fixed rails 8. The lower bracket 3 engages the lower part of the hose 1 and an upper bracket 9 engages the upper part thereof. The bracket 9 and the frame 2, 3, 4 are both supported on the jack screw which in turn is supported on the bracket 7, as will be described presently. The arrangement is such that when the screw is operated, the frame including the bracket 3 is raised, while at the same time, the bracket 9 is lowered so that the hose 1 is compressed between the two brackets 3 and 9 to shut off any flow of fluid therethrough. Such pinch valves are well known in the art, and therefore require no further description here, as this structure is not part of the present invention.

A sleeve member 10 to which may be attached an operating handle 11, or any other suitable means for rotating the sleeve, provides the main operating element of the jack screw. The lower end of this sleeve is formed with a journal portion 12 operating in a bearing 13 on the bracket 7. This, therefore, supports the sleeve 10 in the upright position shown in Fig. 1.

Surrounding a portion of the sleeve 10 is an outer screw member in the form of a sleeve 14. This latter sleeve is fitted with sufficient clearance so as to be easily movable along the sleeve 10.

Formed on the interior face of the sleeve 14 is a helical groove 15 forming an internal thread in the sleeve 14. A similar groove 16 forms a matching thread on the outer surface of the sleeve 10. The grooves 15 and 16 are formed, as will be described in detail presently, to provide ball races and a plurality of steel balls 17 are arranged to roll in said races. These balls provide a screw coupling between the sleeves 10 and 14. By screw coupling, as herein used, is meant the type of coupling formed between an ordinary screw and a nut by the interacting contact of their engaging screw threads so that when one is rotated relatively to the other, a relative axial movement is produced.

The interior face of the sleeve 10 is provided with a helical groove 18 forming a thread, and the exterior surface of an inside screw member 19 is provided with an external thread 20 matching the thread 18. The threads 18 and 20 are in all respects similar to the threads 15 and 16 already described, and balls 17 provide a screw coupling between them. The lower end of the inner screw member 19 is connected at 21 to the bracket 9. The outside screw member 14 is secured in the bracket 2 in any suitable manner as by mounting the same on a sleeve or socket 22, as shown in Fig. 1. Thus, the rotation of the sleeve 10 will cause relative axial movement between that sleeve and the sleeve 14, and also between the sleeve 10 and the inner member 19. In the embodiment shown, these two axial movements relative to the intermediate sleeve 10 are added together to produce the relative axial movement between the members 14 and 19 and this relative movement is transmitted to the brackets 3 and 9.

The threads 16 and 18 on the inner and outer surfaces of the sleeve 10, respectively, are arranged to terminate at adjacent points on the inside and outside of the sleeve at both their upper and their lower ends. At the upper end, a passage 23 is formed in the sleeve extending therethrough from the inside to the outside, and connecting the upper termini of the threads 16 and 18. Similarly, at the lower ends of these threads, a similar passage 24 extends through the sleeve connecting the lower ends of these threads. Accordingly, the balls 17 which interconnect the ball races on both the inside and outside of the sleeve 10 will roll along those ball races as the sleeve 10 is rotated, and in so doing, will move the members 14 and 19 by virtue of their screw thread action. As the balls roll along these races, each one in turn will eventually arrive at one of the passages 23 or 24. When a ball arrives at this point, it passes through from the inside to the outside or vice versa, depending upon whether it passes through the upper or lower passage and upon the direction in which the sleeve 10 is rotated. It will be seen, therefore, that the inner threads 18, 20 will form a return path for the balls passing up or down along the races 15 and 16, and conversely, the latter races will form a return passage for balls which have reached the end of the inner races 18, 20.

Figure 4:
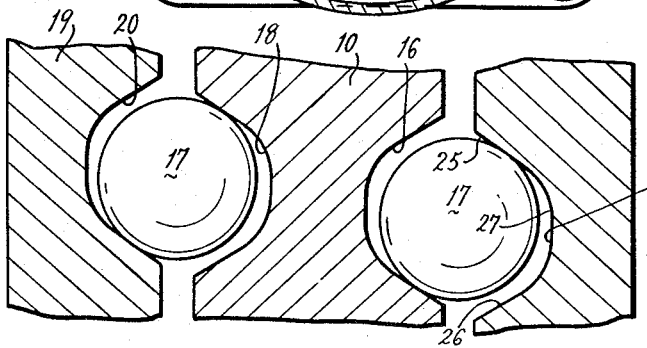
Fig. 4 is an enlarged detail section of a portion of the ball races and the balls therein.

As shown in Fig. 4, the grooves 15, 16, 18 and 20 are not circular in cross section, but have their upper and lower portions 25 and 26 respectively formed so as to be positioned at an angle of 60 degrees to each other and 30 degrees to the common axes of these screw threads. The inner portion of the groove is flattened somewhat at 27 so as to provide just an ample clearance for the balls 17. This arrangement of the ball races provides that the balls will always contact the 60-degree portions which form the bearing surfaces so that the line of pressure passing through the center of the ball will form a constant angle with the screw axis. Also, any slight side movement will cause the balls to roll along these parallel surfaces so that this angle pressure remains substantially constant.

It will be seen, therefore, that this invention provides a ball bearing screw adapted to provide an actuating mechanism for many different purposes. It has the frictionless characteristics of ball bearings and at the same time, is compact and simple since one pair of ball races provides a return path for the balls discharged by the other. The threads on the inner and outer surfaces of the sleeve 10 may be either both right-handed or one right-handed and the other left-handed. In the first case, the axial travel produced by one revolution of the sleeve will be the sum of the screw pitches, while in the second, it will be the difference between these pitches. Thus, either a compound screw may be used to provide rapid axial movement or a differential screw may provide a relatively slow movement compared to the rotation of the intermediate member 10.

Various changes may be made in the details of construction, within the scope of the appended claims, without departing from the spirit of this invention. Parts of the invention may be used without the whole and improvements may be added while retaining some or all of the advantages of the invention.

I claim:

1. A screw jack of the character described, comprising, an outer screw member formed with a helical internal ball-race providing a first thread, an intermediate sleeve formed with an external helical ball-race providing a second thread matching said first thread and with an internal helical ball-race providing a third thread, an inner screw member formed with an external helical ball-race providing a fourth thread matching said third thread, said sleeve and screw members being coaxial, balls rollable in the pair formed by said first and second threads connecting the same to form a screw coupling, and balls rollable in the pair formed by said third and fourth threads connecting the same to form a second screw coupling, said intermediate sleeve being formed with passages therethrough joining the adjacent termini of said second and third threads whereby the balls may pass from one of said threads to the other, each of said pairs of threads providing a return path for balls from the other.

2. A screw jack of the character described, comprising, an outer screw member formed with a helical internal ball-race providing a first thread, an intermediate sleeve formed with an external helical ball-race providing a second thread matching said first thread and with an internal helical ball-race providing a third thread, an inner screw member formed with an external helical ball-race providing a fourth thread matching said third thread, said sleeve and screw members being coaxial, balls rollable in the pair formed by said first and second threads connecting the same to form a screw coupling, balls rollable in the pair formed by said third and fourth threads connecting the same to form a second screw coupling, and pathways formed in said sleeve positioned to receive balls from each of said pairs of threads and deliver them to the other.

References Cited in the file of this patent

UNITED STATES PATENTS

| | | |
|---|---|---|
| 2,338,271 | Ulanet | Jan. 4, 1944 |
| 2,358,763 | Soderquist | Sept. 19, 1944 |
| 2,590,745 | Wuensch | Mar. 25, 1952 |